United States Patent [19]

Lukos

[11] Patent Number: 5,224,307
[45] Date of Patent: Jul. 6, 1993

[54] FRAME ASSEMBLY USING MASTER RIB WITH POSITIONABLE CLEATS

[76] Inventor: Stephen P. Lukos, 1879 Litchfield Rd., Watertown, Conn. 06795

[21] Appl. No.: 897,568

[22] Filed: Jun. 11, 1992

Related U.S. Application Data

[63] Continuation-in-part of Ser. No. 759,676, Sep. 13, 1991, abandoned.

[51] Int. Cl.$^5$ .............................................. E04B 1/19
[52] U.S. Cl. ...................................... 52/86; 403/200; 403/246; 403/187
[58] Field of Search ....................... 403/200, 246, 187; 52/86, 656

[56] References Cited

U.S. PATENT DOCUMENTS 4,774,790 10/1988 Hopper .................................. 52/86

FOREIGN PATENT DOCUMENTS 255923 7/1948 Switzerland ......................... 403/187
760956 11/1956 United Kingdom ................. 403/200

*Primary Examiner*—Carl D. Friedman
*Assistant Examiner*—Wynn E. Wood
*Attorney, Agent, or Firm*—John H. Crozier

[57] ABSTRACT

A frame assembly, such as for an awning or canopy, includes a master rib having identical keyways running the longitudinal length of the rib. Each keyway is defined by an opposing pair of sidewalls extending lengthwise in the longitudinal direction. The sidewalls are each formed integrally with a plurality of threadlines extending in the longitudinal direction which face opposite from and are offset in the depthwise direction by a given pitch from those of the other sidewall, so as to form threadable surfaces for a screw to be threaded therein. A cleat member has a body portion with a depthwise bore so that a threaded screw can be inserted depthwise and project from its lower end into the keyway and the master rib. The cleat member can be fastened to the master rib at any position along its longitudinal length. The cleat member preferably has a mating cleat which projects from the lower end into the keyway, or brackets against the sides of the master rib wall, so as to guide and hold the cleat member firmly in position. The cleat member can then be fastened to a lateral arm, cross rib, angle rib, hinged member, or other frame part. The frame assembly is used to construct an awning support system or a canopy system without any need for welding at the installation site, and can be readily disassembled and reassembled. In a further embodiment, the keyway is provided with smooth walls and a self-tapping or similar screw forms threads in the walls as the screw is advanced into the keyway.

11 Claims, 7 Drawing Sheets

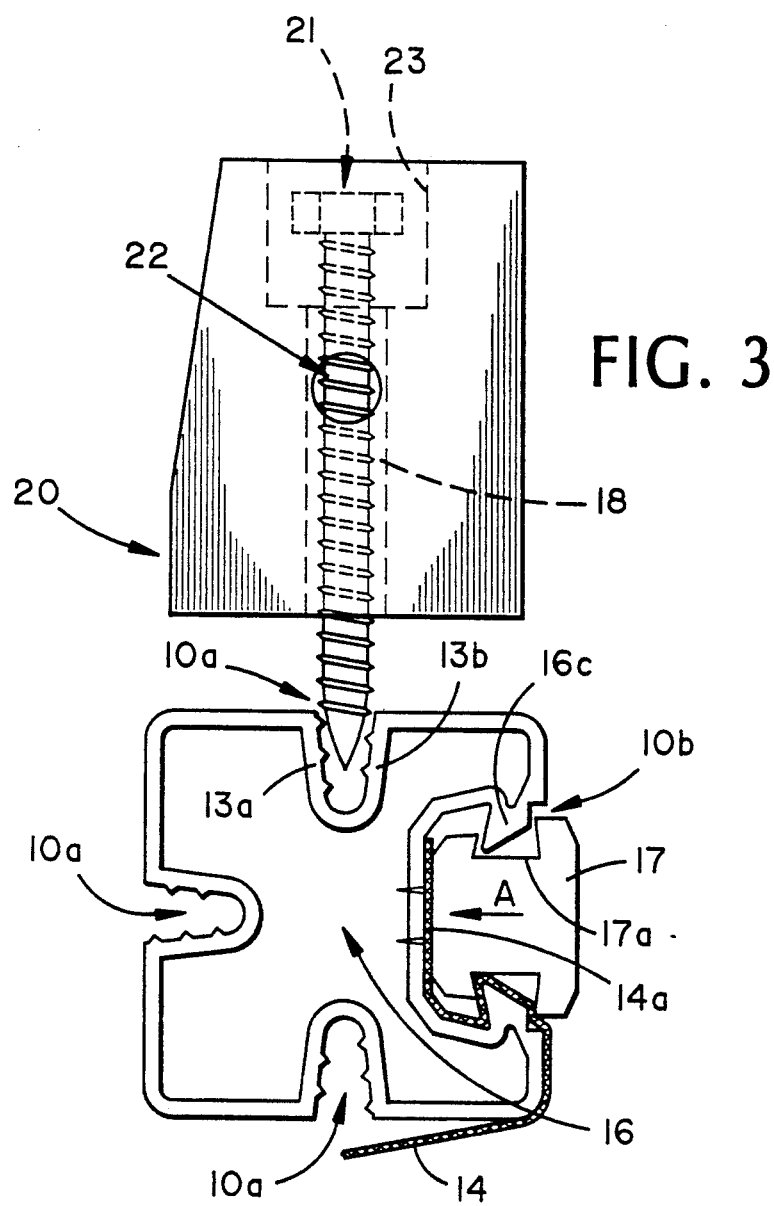
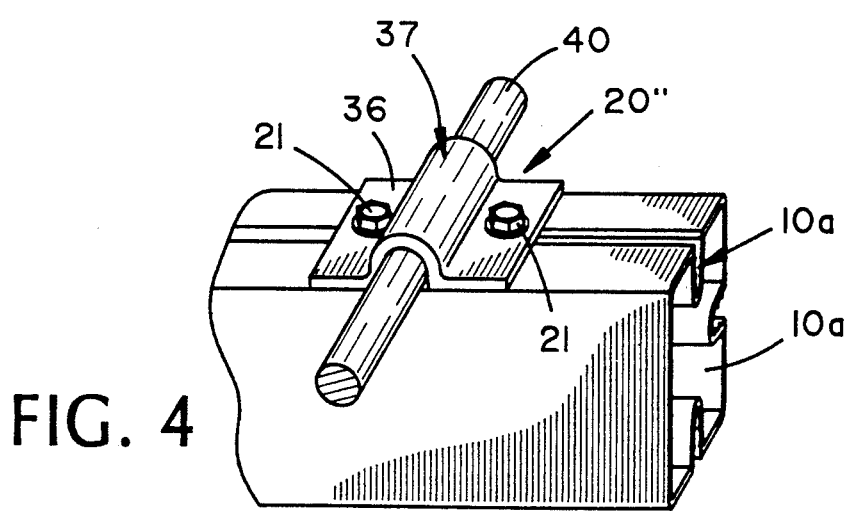

FRAME ASSEMBLY USING MASTER RIB WITH POSITIONABLE CLEATS

CROSS-REFERENCE TO RELATED APPLICATION

This is a continuation-in-part of copending U.S. application Ser. No. 07/759,676, filed Sep. 13, 1991, now abandoned.

FIELD OF THE INVENTION

This invention generally relates to a frame assembly, such as used to support an awning or canopy, and more particularly, to an assembly using a master rail with positionable cleats.

BACKGROUND ART

Frame assemblies for awning, canopy, or side enclosure systems may be free-standing or mounted to the wall or frame of a building and generally have struts or ribs which are joined at their ends to a cross rib or rail so as to create a support for stretching and holding an awning, canopy or cover thereon. In conventional systems, the cross rib and ribs or struts are manufactured in fixed lengths and must be welded together at the installation site. This makes it difficult to adapt the awning structure to different sizes of storefronts or areas to be covered. One proposed system, shown in U.S. Pat. No. 4,926,605 to Milliken et al., avoids the problem of fixed sizes by providing tubular rails and support arms which can be cut to the desired dimensions and welded together at the building site. However, welding of the awning structure requires that welding equipment be available, thereby making installation of the awning inconvenient.

Accordingly, it is a principal object of the invention to provide a frame assembly for an awning or canopy which is readily adaptable to different lengths and sizes and is capable of installation without the need for any welding.

SUMMARY OF THE INVENTION

In accordance with the invention, a frame assembly includes a master rib extending a given length in a longitudinal direction and having a keyway formed in a wall thereof running the length of the rib and extending in a depthwise direction into the rib. The keyway is defined by an opposing pair of sidewalls extending lengthwise in the longitudinal direction. The sidewalls are each formed integrally with a plurality of threadlines extending in the longitudinal direction which face opposite from and are offset in the depthwise direction by a given pitch from those of the other sidewall, so as to form threadable surfaces for a screw to be threaded therein. A cleat member includes a body portion having a depthwise bore therethrough in which a screw of a given length is inserted from an upper end so as to extend depthwise through the cleat member and project from a lower end wherein the screw is threaded via said threadable surfaces of said keyway fixedly into said master rib, so as to thereby fasten said cleat member to said master rib in any selected position along the longitudinal length thereof.

The cleat member preferably has a key or mating cleat which projects from the lower end of the cleat member into the keyway, or brackets against the sides of the master rib wall, so as to guide and hold the cleat member firmly in position and prevent its rotation on the screw axis. The cleat member is used to hold a cross rib at a right or other predetermined angle to the master rib. In one embodiment, the cross rib is abutted against one lateral side of the cleat member and fastened thereto via a threaded screw. In other preferred embodiments, the cross rib is formed with an open end and tubular cross-section which sleeves over the cleat member, and the cross rib is fastened to the cleat member by means of tapping screws threaded into aligned holes formed in the cross rib and in the cleat member. An angle rib assembly can be formed by using the cleat member to hold a leaf portion of a hinged member to the master rib, while a coupled fastener portion is fastened to the angle rib.

In one embodiment, the master rib is preferably formed with a square tubular cross-section and identical threaded keyways on three sides, with the fourth side having a finished surface for an aesthetic appearance. Alternatively, the master rib is formed with a tubular cross-section (and identical threaded keyways) of any one of the following shapes, namely square, rectangle, diamond, round, round with flat sides, bullet and square with round edges. The keyways or screw tracks can be one or more per side and on one or more or all sides. The keyways allow the fastening point of the cleat member on the master rib to be at any position along its length. Thus, the frame assembly can be erected entirely without welding, simply by fastening the cleat members in the proper positions and cutting the master rib to the desired length. The cleat members are hidden by the adjoining ribs.

In a further embodiment, said keyway is provided with smooth walls and a self-tapping or similar screw forms threads in said walls as said screw is advanced into said keyway.

Other objects, features, and advantages of the present invention will become apparent from the following detailed description of the best mode of practising the invention when considered in conjunction with the drawings, as follows:

DESCRIPTION OF THE DRAWINGS

FIG. 3 is a schematic side view showing a cleat member and front rib for an awning support system.

FIG. 4 is a schematic perspective view showing the use of a cleat member to hold a lacing rod or reinforcing rod to a square rib.

DESCRIPTION OF THE PREFERRED EMBODIMENTS

Figure 1:
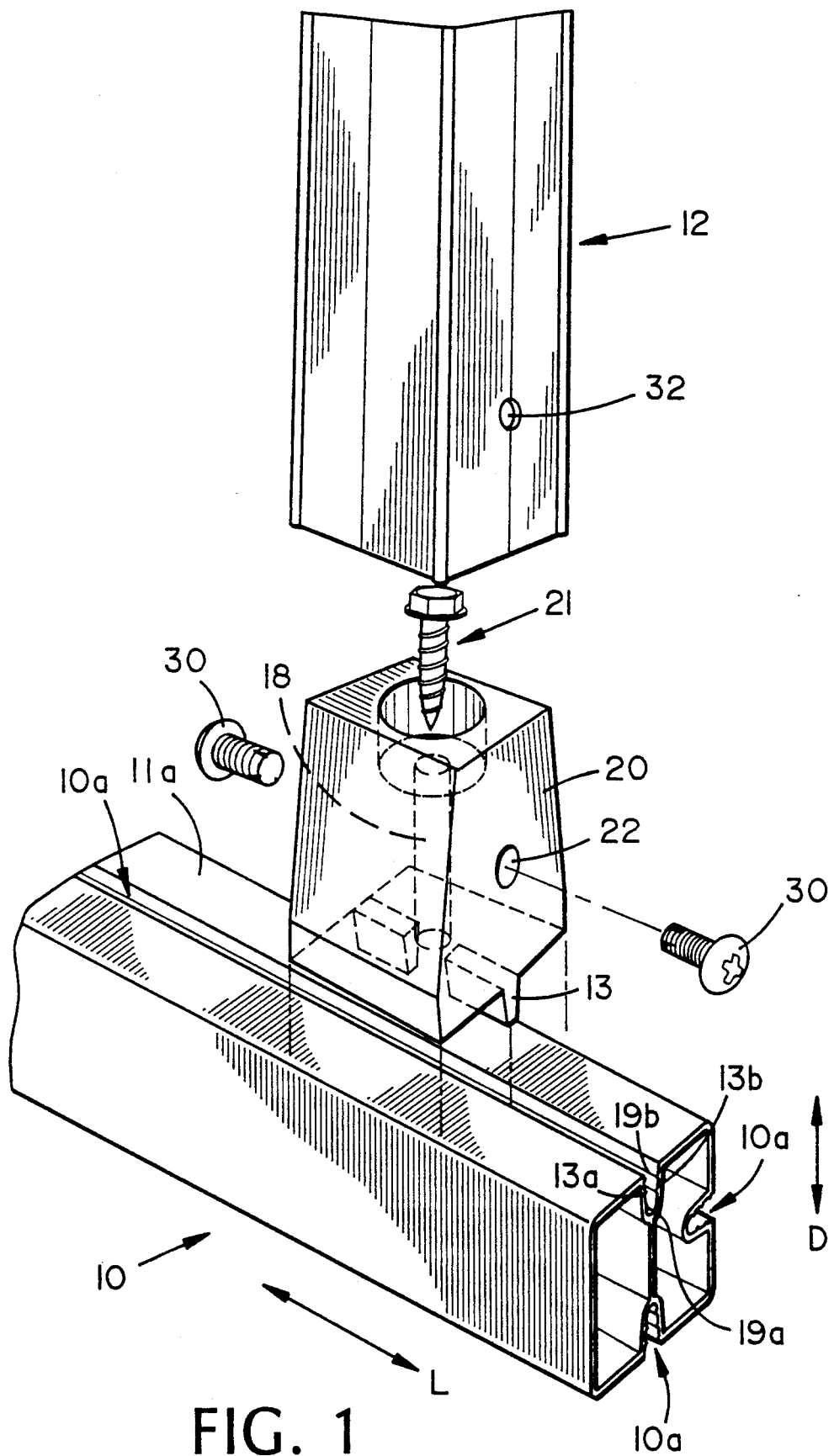
FIG. 1 is a schematic perspective view of a frame assembly using a square rib with cleat members positionable in keyways anywhere along its length in accordance with the invention.

In FIG. 1, a frame assembly includes a master rib 10 extending a given length in a longitudinal direction L and having at least one keyway 10a formed in one side wall 11a, a cleat member 20, a threaded screw 21, and a lateral rib or cross rib 12. The keyway 10a runs the length of the rib and extends in a depthwise direction D into the rib 10. The keyway 10a is defined by an opposing pair of sidewalls 13a, 13b extending lengthwise in the longitudinal direction L. The sidewalls 13a, 13b are each formed integrally with a plurality of threadlines 19a, 19b, respectively, extending in the longitudinal direction L which face opposite from and are offset in the depthwise direction D by a given pitch from those of the other sidewall, so as to form threadable surfaces for the screw 21 to be threaded therein.

The master rib 10 is preferably formed with a tubular cross-section and identical threaded keyways 10a on three sides, with the fourth side having a finished surface for an aesthetic appearance. The cross-section can have the shape of a square, rectangle, diamond, round, round with flat sides, bullet, square with round edges or any other analogous shape. The cleat member 20 includes a body portion having a depthwise bore 18 therethrough in which the screw 21 is inserted from its upper end so as to extend depthwise through the cleat member 20 and project from its lower end. The screw 21 is threaded via the threadable surfaces of the keyway so as to be fixedly fastened into the master rib 10 at any selected position along the longitudinal length thereof.

The cleat member 20 preferably has a key or mating cleat 13 (in split portions on either side of the bore 18) which projects from the lower end of the cleat member into the keyway 10a, so as to guide and hold the cleat member 20 firmly in position and prevent its rotation on the screw axis. The cleat member 20 is used to hold the lateral rib or cross rib 12 at a right or other predetermined angle to the master rib. In the embodiment shown, the cross rib 12 is formed with an open end and tubular cross-section which sleeves over the cleat member 20, and the cross rib 12 is fastened to the cleat member 20 by means of tapping screws 30 threaded into aligned holes 32 (only one of which is shown) formed in the cross rib 12 and the bore 22 in the cleat member 20.

The keyways allow the fastening point of the cleat member on the master rib to be at any position along its length. Thus, the frame assembly can be erected entirely without welding, simply by fastening the cleat members in the proper positions and cutting the master rib to the desired length. The cleat members are also hidden from view by sleeving the cross ribs over the cleat members.

Figure 2:
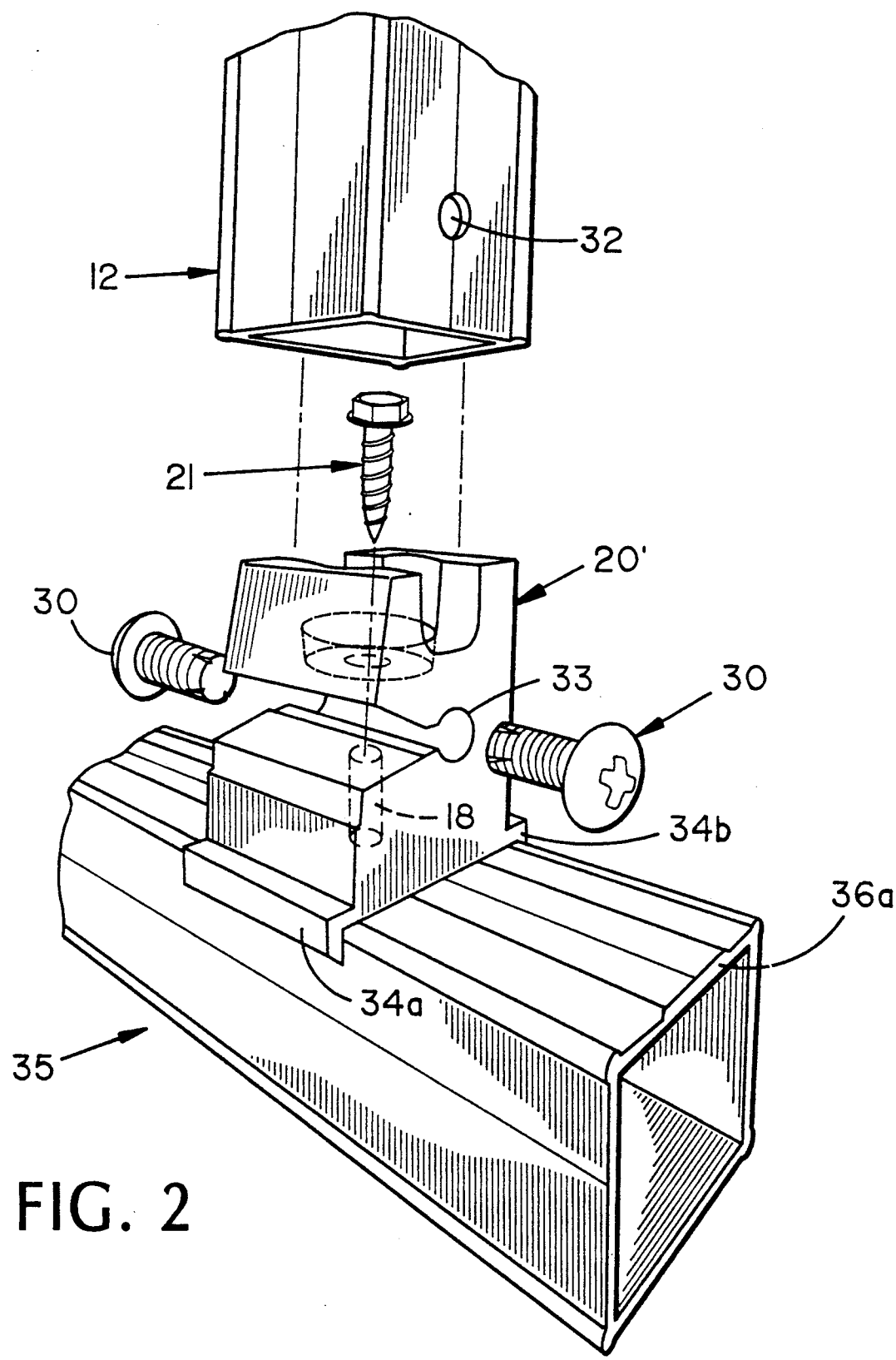
FIG. 2 is a schematic perspective view of the frame assembly using a square rib with a cleat member formed with a saddle-type bracket fitting over the square rib.

In FIG. 2, another version of the cleat member 20' has saddle-type cleats 34a, 34b which bracket over the sides of one wall 36a of a rib or rail 35. The threaded screw 21 is inserted through the body portion of the cleat member 20' and threaded into the wall 36a of the rib or rail 35. Tapping screws 30 are secured through the holes 32 in the rib 12 and into the threaded channel 33 formed in the cleat member 20'.

FIG. 3 is a side elevational view showing a cleat 20 being joined to the front rib or rail 16 of an awning using a cleat member 20 at each corner joint with the lateral arms. The cleat 20 has the two bores 22 and 23 oriented perpendicular to each other. The rail is formed from hollow tubing having one or more keyways 10a formed in its walls on respective sides thereof. The tubing is preferably made of metal, but can also be made of high strength plastic or composite material. The cleat 20 is fastened to the rail 16 by the screw 21 threaded rail. The screw 21 has a hex head which is hidden in the recessed cavity 23.

In the preferred embodiment, the rail 16 is formed from square tubing with identical keyways 10a on three sides, and a stapling groove 10b on the fourth side. The rail 16 can also be formed with keyways distributed around tubing of round or other polygonal profile for different angles between the cleat positions and the groove 10b. A sealing strip 17 is press-fitted or snapped into the groove 10b (in the direction of arrow A) in order to hold the fabric therein and seal the groove against water penetration which may deteriorate the fastening of the leading end of the fabric. The sealing strip 17 can have slots or grooves 17a for snap-fitting with projections 16c formed at the open end of the groove 10b.

The use of the cleat member 20 and threaded and tapping screw forms a strong, rigid joint of the lateral arm with the rail, and entirely eliminates the need for welding. The cleat members are also hidden behind the adjoining arm and rail for an aesthetic appearance. The extension of the keyways 10a along the length of the rib allows the rail to be cut to any desired length, so that the fastening point of the cleat member 20 to rail can be formed at any position along its length, thereby facilitating installation for different sizes of frames from standard parts.

In FIG. 4, a cleat member 20'' for holding a lacing or reinforcing rod 40 is formed as a flat plate 36 having a center rod-holding section 37 and mounting holes for two threaded screws 21 which thread into the threaded surfaces of the keyway 10a and into the rib 10. The plate 36 also has a key (not shown) on its lower end which guides and holds the cleat member 20'' in the keyway 10a of the rib 10, as described previously.

Figure 5:
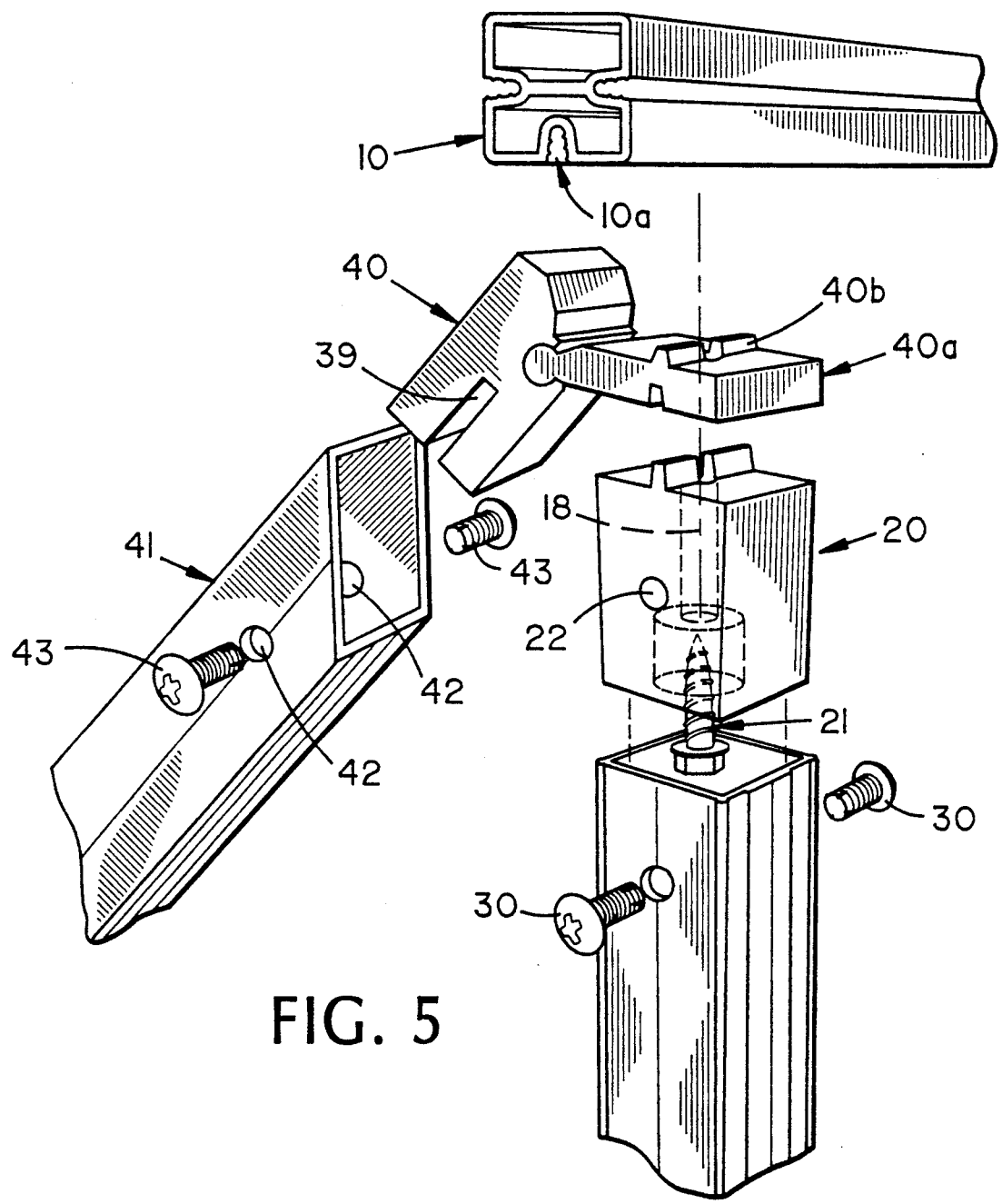
FIG. 5 is a schematic perspective view showing a hinged cleat member used in an angle rib assembly.

In FIG. 5, an angle rib assembly is formed by using a cleat member 20 fastened into the keyway 10a of the master rib 10 through a leaf 40a of an internal fastening member 40. The leaf 40a has a ball pin which slides into a correspondingly shaped socket of the member 40, and a key 40b. The member 40 is fastened into an angle rib 41 which has a tubular cross-section that sleeves over the member 40. Tapping screws 43 are inserted through the holes 42 formed in the angle rib and a slotted recess 39 formed in the hinged member 40. When fastened to the angle rib 41, the leaf 40a and member 40 are unable to slide apart. Angles of 15 degrees to 70 degrees can be obtained with this construction. The key 40b is adapted to fit into the keyway 10a, and has an angle from 15 degrees to 70 degrees.

Figure 6A:
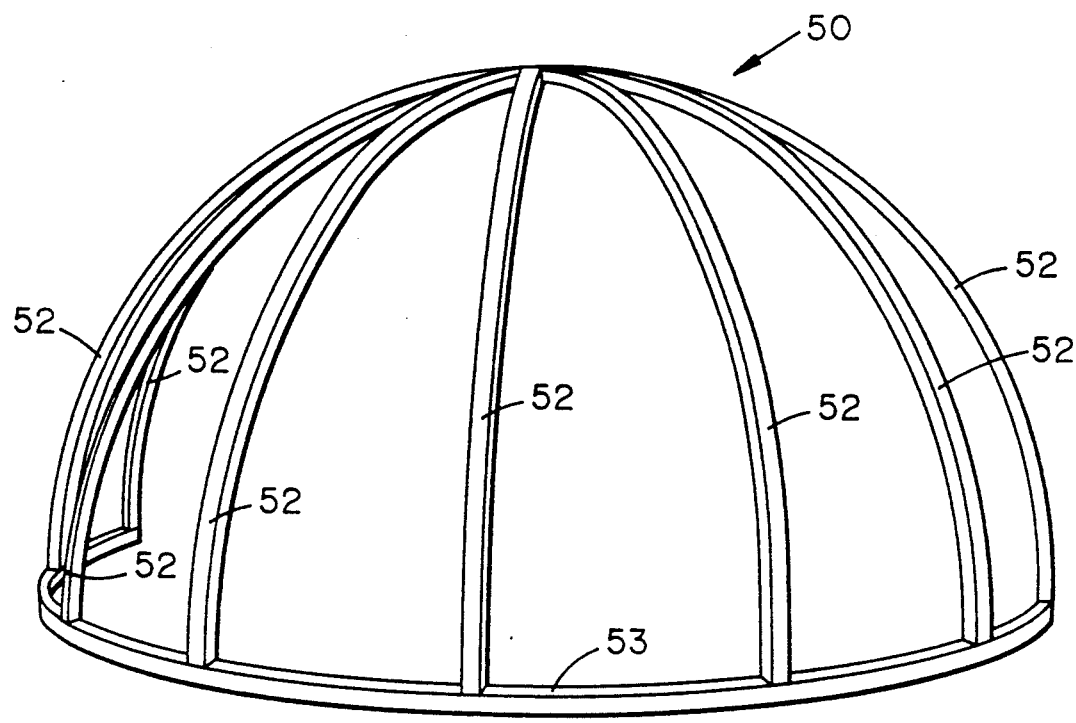
FIGS. 6A and 6B show the use of a radius connecting plate to hold a plurality of ribs to the square ribs of a dome assembly.
Figure 6B:
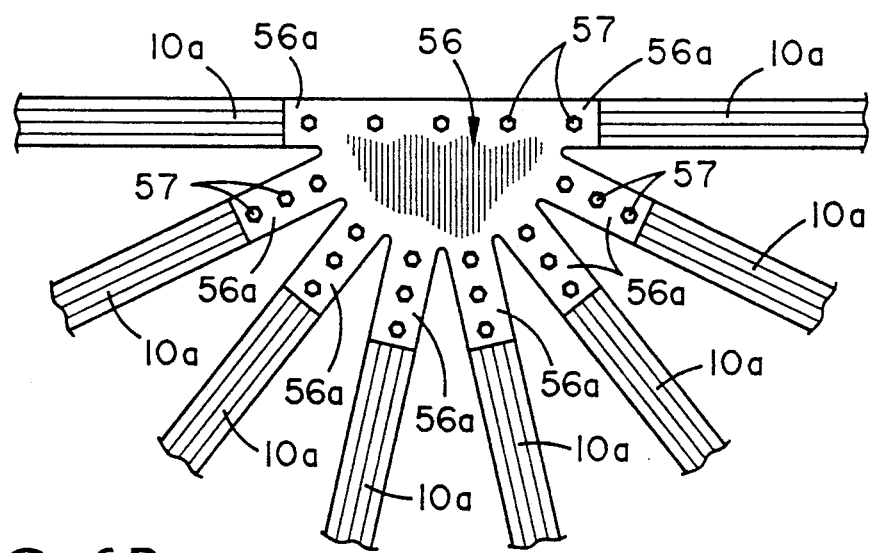

In FIGS. 6A and 6B, a dome assembly 50 is formed using the concept of the present invention. The dome assembly has a plurality of (here eight) radial ribs 52 and a master rib 53 in the form of a semicircular base. The radial ribs are fastened together at a central point of the dome assembly by means of a radius connecting plate 56 having respective arms 56a for each rib and screws 57 which are threaded through the respective arms 56a into the keyways 10a of the respective ribs. The bottom ends of the radial ribs are fastened to the master rib 53 by sleeving over and fastening to the respective cleat members, as previously described.

Figure 7:
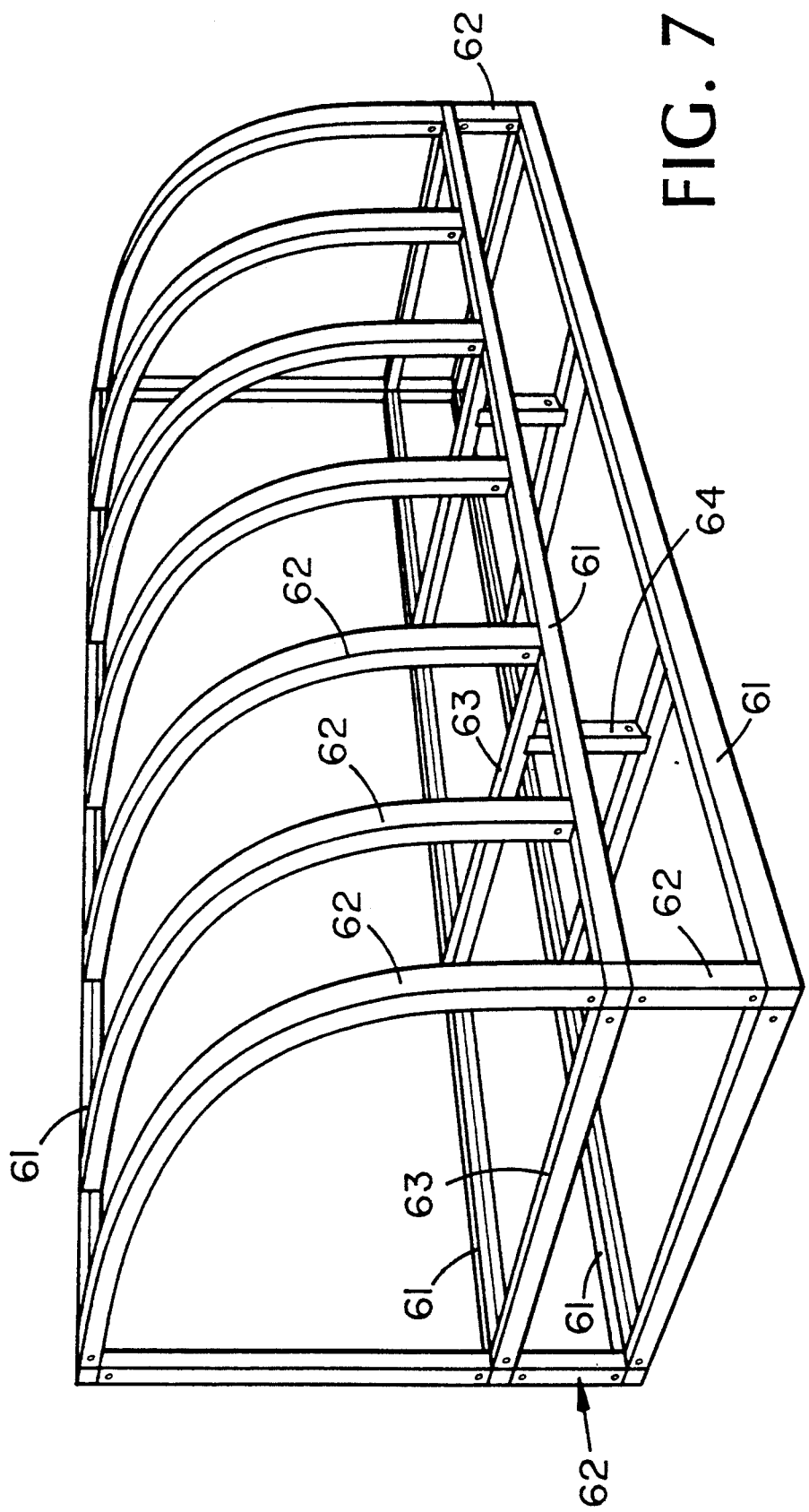
FIG. 7 shows the use of cleat members and offset ribs with saddle cleats in a rib assembly.

In FIG. 7, a vertical rib assembly 60 is shown such as might be used for a greenhouse or other light-weight enclosure. The vertical rib assembly has master ribs 61 which define the main longitudinal frame supports for the assembly. Vertical ribs 62 and cross rib 63 are fastened by cleat members to the main ribs 61, as described with reference to FIG. 1. Offset ribs 64, with saddle cleats described with reference to FIG. 2, are fastened at intermediate positions on the cross ribs 63 in order to support the cross ribs at positions recessed from the master ribs.

Figure 8:
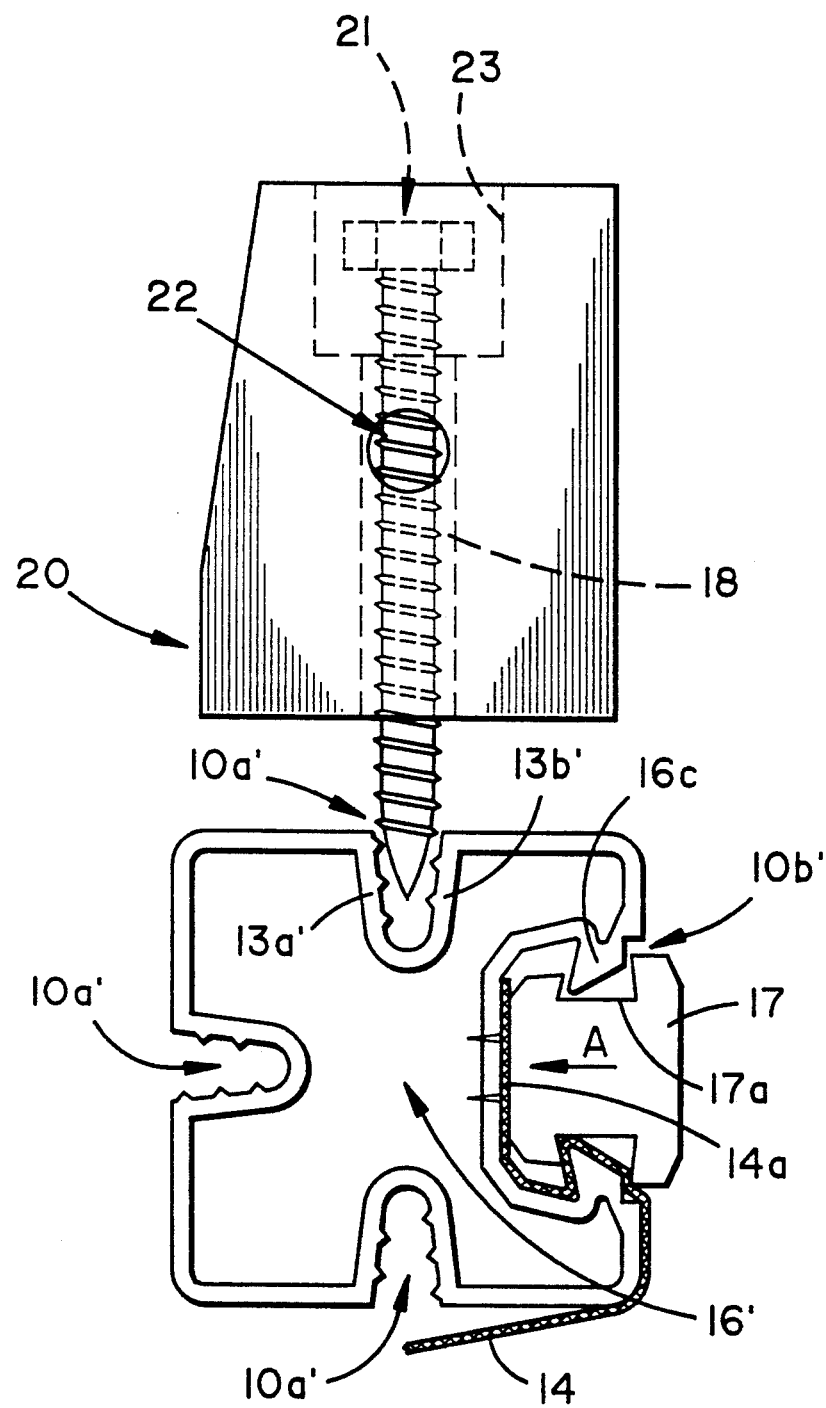
FIG. 8 is a schematic side view showing a cleat member and an alternative front rib construction for an awning support system.

FIG. 8 illustrates an alternative embodiment of a master rib 16' having keyways 10a'. Rather than having threadlines, such as threadlines 19a and 19b of keyway 10a on FIGS. 1 and 3, keyways 10a' have smooth walls. With such a construction, screw 21 would be provided as a self-tapping or a self-threading screw which would be threadingly advanced into the floor of a keyway 10a'. Walls of keyways 10a' may be spaced such that the threads of self-tapping or self-threading screw 21 will cut into and threadingly engage the walls.

The frame assembly with cleat fasteners in accordance with the present invention can thus be used to construct awning frames, canopy frames, glass enclosures, show displays, sign frames, greenhouses, partitions, structural and non-structural framed walls, and tents without welding, brazing, or soldering. The awning canopy, dome, or enclosure frames, for example, as shown in FIGS. 6 and 7, may be freestanding or attached to a wall of a building. The components of the system can be made of aluminum, polyvinyl chloride (PVC) plastic, pulltrusions, copper, brass, steel, or any other material having structural strength which can be formed into the shape needed. The keyways of the master ribs are dimensioned to receive and apply the proper pressure for threading of the screw fasteners. The screw fasteners are generally threaded through the bottom floor of the keyways through the wall of the master rib for greater holding pressure. The lateral rib and cross ribs can then be readily fastened to the positioned cleat member using tapping screws. The aligned holes in the cross ribs and cleat members can even be drilled at the installation site. The holes can also be tapped to accept standard machine bolts or screws instead of self-tapping bolts or screws.

The bolts or screws can be removed and the assembly can be disassembled if necessary and/or reinstalled. This allows a dealer to pre-assemble any size frame in the shop and disassemble it for shipping. The simple construction, flexible positioning, and interchangeability of the parts of the system allows any structure to be assembled very quickly and easily.

Numerous modifications and variations are of course possible in light of the principles of the invention disclosed above. All such modifications and variations are intended to be included within the spirit and scope of the invention, as defined in the following claims.

I claim:

1. A frame assembly, comprising:
    (a) a master rib extending a given length in a longitudinal direction and having a U-shaped keyway formed in a wall thereof running the length of said master rib and extending in a depthwise direction into said master rib, said keyway having an opposing pair of integral side walls extending lengthwise in the longitudinal direction;
    (b) at least one cleat member having a body portion;
    (c) a threaded screw fastener which extends through said body portion of said cleat member and into said keyway of said master rib, while threadingly engaging said side walls, so as to thereby fasten said cleat member to said master rib in any selected position along the longitudinal length thereof; and
    (d) an other rib and fastening means for fastening said other rib to said cleat member.

2. A frame assembly, as defined in claim 1, wherein said sidewalls are each formed integrally with a plurality of threadlines extending in the longitudinal direction which face opposite from and are offset in the depthwise direction by a given pitch from those of the other sidewall, so as to form threadable surfaces for said screw to be threaded therein.

3. A frame assembly, as defined in claim 1, wherein said sidewalls are substantially smooth, said screw is a self-tapping or selfthreading screw, and said sidewalls are spaced such that said screw will cut into and threadingly engage said sidewalls.

4. A frame assembly, as defined in claim 1, wherein said screw extends threadingly through the base of said U-shaped keyway.

5. A frame assembly, as defined in claim 1, wherein said cleat member has a mating cleat which projects from a lower end of said cleat member into said keyway, so as to guide and hold said cleat member firmly in position and prevent its rotation about the screw axis.

6. A frame assembly, as defined in claim 1, wherein said cleat member has a depthwise bore therethrough from an upper end to a lower end of said cleat member, so that said screw fastener is inserted depthwise through said cleat member and projects from the lower end thereof into said keyway.

7. A frame assembly, as defined in claim 1, wherein said other rib is a cross rib that is abutted against one lateral side of said cleat member and fastened thereto.

8. A frame assembly, as defined in claim 1, wherein said other rib is formed with an open end and tubular cross-section which sleeves over said body portion of said cleat member.

9. A frame assembly, as defined in claim 1, wherein said other rib is fastened to said cleat member by means of self-tapping screws threaded into aligned holes formed in said other rib and said cleat member.

10. A frame assembly, as defined in claim 1, wherein said master rib is preferably formed with a tubular cross-section of a shape selected from the group consisting of square, rectangle, diamond, round, round with flat sides, bullet, and square with round edges, with a longitudinal keyway formed in at least one side thereof.

11. A frame assembly, as defined in claim 1, wherein said master rib can be a front rail of said frame system.

* * * * *